(12) United States Patent
Ma et al.

(10) Patent No.: US 12,375,595 B2
(45) Date of Patent: Jul. 29, 2025

(54) ELECTRONIC DEVICE

(71) Applicant: Honor Device Co., Ltd., Shenzhen (CN)

(72) Inventors: Dong Ma, Shenzhen (CN); Xinwen Xu, Shenzhen (CN); Kuan Lu, Shenzhen (CN); Yan Lv, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 644 days.

(21) Appl. No.: 17/763,336

(22) PCT Filed: Feb. 1, 2021

(86) PCT No.: PCT/CN2021/074618
§ 371 (c)(1),
(2) Date: Mar. 24, 2022

(87) PCT Pub. No.: WO2021/155767
PCT Pub. Date: Aug. 12, 2021

(65) Prior Publication Data
US 2022/0377162 A1 Nov. 24, 2022

(30) Foreign Application Priority Data
Feb. 5, 2020 (CN) .......................... 202010080473.2

(51) Int. Cl.
*H04M 1/02* (2006.01)
*H04N 23/00* (2023.01)
(Continued)

(52) U.S. Cl.
CPC ....... *H04M 1/0264* (2013.01); *H04M 1/0283* (2013.01); *H04N 23/00* (2023.01);
(Continued)

(58) Field of Classification Search
CPC .. H04M 1/0264; H04M 1/0283; H04N 23/00; H04N 23/50; H04N 23/51; H04N 23/52; H04N 23/57
See application file for complete search history.

(56) References Cited

U.S. PATENT DOCUMENTS 11,064,098 B2 * 7/2021 Zhang .................... H04N 23/51
2010/0272427 A1 * 10/2010 Jung ....................... H04N 23/51
396/427

(Continued)

FOREIGN PATENT DOCUMENTS

CN 201600536 U 10/2010
CN 104580861 A 4/2015
(Continued)

*Primary Examiner* — Amy R Hsu
(74) *Attorney, Agent, or Firm* — Conley Rose, P.C.

(57) ABSTRACT

An electronic device includes a housing with a mounting hole, a camera module, and a decorative part. The camera module includes a lens and a module body connected to the lens. The decorative part includes a decorative part body and a skirt structure connected to the decorative part body. The skirt structure is provided with a notch. The notch is opposite to the module body. The skirt structure of the decorative part does not interfere with the camera module, such that the camera module is less prone to being damaged by the skirt structure.

20 Claims, 10 Drawing Sheets

(51) Int. Cl.
*H04N 23/50* (2023.01)
*H04N 23/51* (2023.01)
*H04N 23/57* (2023.01)

(52) U.S. Cl.
CPC ............ *H04N 23/50* (2023.01); *H04N 23/51* (2023.01); *H04N 23/57* (2023.01)

(56) References Cited

U.S. PATENT DOCUMENTS

| | | |
|---|---|---|
| 2018/0219202 A1 | 8/2018 | Okazaki et al. |
| 2019/0041909 A1 | 2/2019 | Pakula et al. |
| 2019/0387144 A1 | 12/2019 | Zhang |
| 2020/0021721 A1 | 1/2020 | Chen et al. |
| 2021/0120157 A1* | 4/2021 | Xu .......................... G02F 1/137 |

FOREIGN PATENT DOCUMENTS

| | | |
|---|---|---|
| CN | 204886938 U | 12/2015 |
| CN | 105872335 A | 8/2016 |
| CN | 205901895 U | 1/2017 |
| CN | 107809507 A | 3/2018 |
| CN | 207234840 U | 4/2018 |
| CN | 207491070 U | 6/2018 |
| CN | 207706289 U | 8/2018 |
| CN | 108521541 A | 9/2018 |
| CN | 108632509 A | 10/2018 |
| CN | 109451228 A | 3/2019 |
| CN | 110365885 A | 10/2019 |
| CN | 110430346 A | 11/2019 |
| CN | 110572498 A | 12/2019 |
| CN | 110602362 A | 12/2019 |
| WO | 2019238080 A1 | 12/2019 |

\* cited by examiner

ELECTRONIC DEVICE

This application is a U.S. National Stage of International Application No. PCT/CN2021/074618 filed on Feb. 1, 2021, which claims priority to Chinese Patent Application No. 202010080473.2, filed with China National Intellectual Property Administration on Feb. 5, 2020, both of which are incorporated herein by reference in their entireties.

TECHNICAL FIELD

This application relates to the field of electronic device technologies, and in particular, to an electronic device.

BACKGROUND

In the current development trend of electronic devices such as smartphones, requirements for photographing functions of electronic devices are getting higher, resulting in a larger size of a camera module and greater thickness of the electronic devices, which hinders improvement of market competitiveness of the electronic devices.

Figure 1:
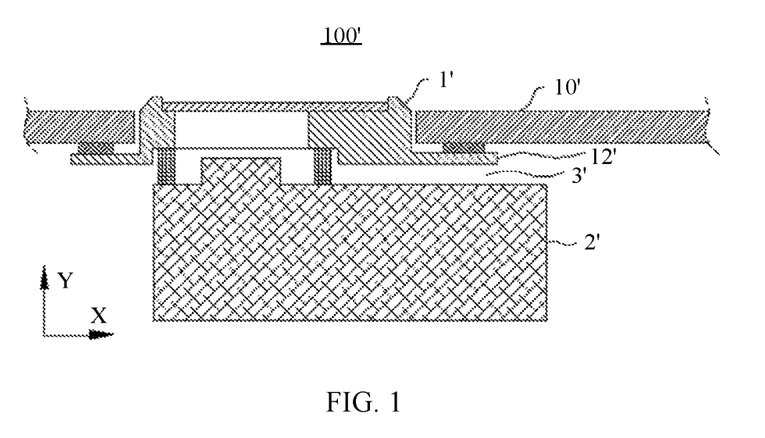
FIG. 1 is a partial sectional view of an electronic device provided in the background art.
Figure 2:
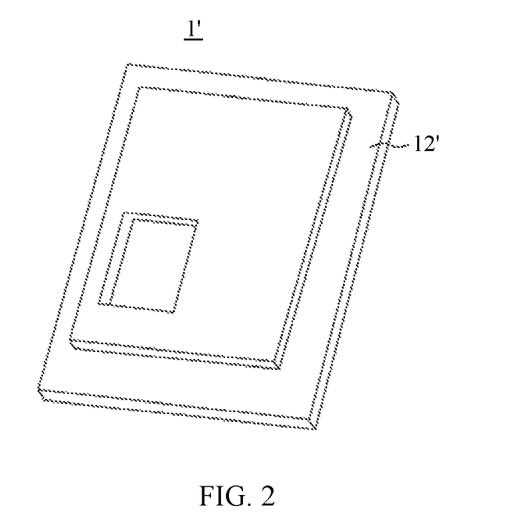
FIG. 2 is a schematic structural diagram of a decorative part in FIG. 1.

FIG. 1 is a partial sectional view of an electronic device provided in the related art; and FIG. 2 is a schematic structural diagram of a decorative part in FIG. 1. The electronic device 100' includes a housing 10', a decorative part 1', and a camera module 2'. The decorative part 1' is connected to both the housing 10' and the camera module 2'. To ensure a reliable connection between the decorative part 1' and the housing 10', the decorative part 1' is provided with a skirt structure 12', and the skirt structure 12' may be fastened to an inner wall of the housing 10'.

When the camera module 2' (for example, the camera module 2' of the electronic device 100' shown in FIG. 1) has a large size, a length, along a length direction X, of the camera module 2' exceeds the edge of the skirt structure 12' of the decorative part 1'. This may result in interference between the skirt structure 12' and the camera module 2' in a thickness direction Y. For example, the housing 10' of the electronic device 100' is squeezed (for example, being squeezed by collision or dropping). As a result, the edge of the skirt structure 12' touches the camera module 2', thereby causing damage to the camera module 2'. To ensure that the camera module 2' is not damaged by the decorative part 1', an avoidance space 3' of a certain distance may be disposed between the skirt structure 12' and the camera module 2'. This may result in an increase of a thickness of the electronic device 100', which is not conductive to improving market competitiveness of the electronic device 100'.

Therefore, there is an urgent need for an electronic device to resolve the foregoing problems.

SUMMARY

This application provides an electronic device to ensure that a skirt structure of a decorative part does not interfere with a camera module.

According to a first aspect, an embodiment of this application provides an electronic device, including:
- a housing, where the housing is provided with a mounting hole;
- a camera module, where the camera module includes a lens and a module body connected to the lens; and
- a decorative part, where the decorative part includes a decorative part body and a skirt structure connected to the decorative part body, and the decorative part body is disposed on the periphery of the lens and disposed in the mounting hole; and
- the skirt structure is provided with a notch, the notch is opposite to a part of the module body, and an orthographic projection of the part of the module body opposite to the notch onto a plane of the skirt structure is located does not fall into the skirt structure.

In a possible design, the notch passes through at least a side wall, along a length direction of the module body, of the skirt structure.

In a possible design, along a length direction of the module body, the edge of the orthographic projection of the part of the module body opposite to the notch onto the plane of the skirt structure is located does not exceed the edge of the notch.

In a possible design, along a thickness direction of the module body, the notch at least passes through a surface, opposite to the module body, of the skirt structure.

In a possible design, a first seal is disposed between the module body and the decorative part body, and the first seal is disposed around the periphery of the lens.

In a possible design, a second seal is disposed between the skirt structure and the housing.

In a possible design, the electronic device further includes a third seal, there is a gap between the mounting hole and the decorative part body, and the gap communicates with the notch; and
at least a part of the third seal is disposed in the notch, and the third seal covers the gap corresponding to the notch.

In a possible design, an orthographic projection of the third seal onto the plane of the skirt structure is located does not exceed the edge of the notch, and a sealant is disposed between the third seal and the edge of the notch.

In a possible design, there is a gap between the mounting hole and the decorative part body, the gap communicates with the notch, and at least one of the gap and the notch is provided with a sealant.

In a possible design, the decorative part includes:
- a first decorative part, where a fourth seal is disposed between the first decorative part and an outer wall of the housing, and the fourth seal is disposed around the periphery of the mounting hole; and
- a second decorative part, connected to the first decorative part, where the second decorative part includes the skirt structure, and the second decorative part is connected to both the module body and the housing.

Therefore, in the electronic device provided in this application, the skirt structure of the decorative part is provided with the notch, and the orthographic projection of the part of the module body opposite to the notch onto the plane of the skirt structure is located does not fall into the skirt structure. This ensures that the skirt structure of the decorative part does not interfere with the camera module, and ensures that the camera module is less prone to being damaged by the skirt structure.

REFERENCE SIGNS

100'—electronic device
10'—housing;
1'—decorative part;
12'—skirt structure;
2'—camera module
3'—avoidance space
X—length direction;
Y—thickness direction;
Z—width direction
100—electronic device
10—housing;
101—mounting hole;
102—gap;
1—decorative part;
11—decorative part body;
111—light hole;
112—first mounting portion;
12—skirt structure;
121—notch;
122—second mounting portion;
1a—first decorative part;
1b—second decorative part;
2—camera module;
21—lens;
22—module body;
31—first seal;
32—second seal;
33—third seal;
331—sealant;
34—fourth seal;
4—protection plate.

The accompanying drawings herein are incorporated into this specification and form a part of this specification, illustrate the embodiments conforming to this application, and are intended to explain the principles of this application together with the specification.

DESCRIPTION OF EMBODIMENTS

This application will be described in detail below with reference to the accompanying drawings and embodiments. It should be understood that the specific embodiments described herein are merely used to explain this application but are not intended to limit this application.

In the descriptions of this application, unless otherwise specified and defined explicitly, the terms "first" and "second" are merely intended for a purpose of description, and should not be understood as any indication or implication of relative importance; unless otherwise specified or stated, the term "a plurality of" indicates two or at least two (including two); the terms such as "connection" and "fastening" should be understood in a broad sense. For example, the "connection" may be a fixed connection, a detachable connection, an integrated connection, or an electrical connection; or may be a direct connection, or an indirect connection based on an intermediate medium. A person of ordinary skill in the art can understand specific meanings of these terms in this application based on specific situations.

In the descriptions of the specification, it should be understood that the directional terms such as "up" and "down" described in the embodiments of this application are described from angles shown in the accompanying drawings, and should not be understood as a limitation on the embodiments of this application. In addition, in the context, it should also be understood that when a component is described as being connected "on" or "under" another component, the component may be directly connected "on" or "under" the another component, or may be indirectly connected "on" or "under" another component by using an intermediate component.

FIG. 1 is a partial sectional view of an electronic device provided in the related art; and FIG. 2 is a schematic structural diagram of a decorative part in FIG. 1. The electronic device 100' includes a housing 10', a decorative part 1', and a camera module 2'. The decorative part 1' is connected to both the housing 10' and the camera module 2'. To ensure a reliable connection between the decorative part 1' and the housing 10', the decorative part 1' is provided with a skirt structure 12', and the skirt structure 12' may be fastened to an inner wall of the housing 10'.

When the camera module 2' (for example, the camera module 2' of the electronic device 100' shown in FIG. 1) has a large size, a length, along a length direction X, of the camera module 2' exceeds the edge of the skirt structure 12' of the decorative part 1'. This may result in interference between the skirt structure 12' and the camera module 2' in a thickness direction Y. For example, the housing 10' of the electronic device 100' is squeezed (for example, being squeezed by collision or dropping). As a result, the edge of the skirt structure 12' touches the camera module 2', thereby causing damage to the camera module 2'. To ensure that the camera module 2' is not damaged by the decorative part 1', an avoidance space 3' of a certain distance may be disposed between the skirt structure 12' and the camera module 2'. This may result in an increase of a thickness of the electronic device 100', which is not conductive to improving market competitiveness of the electronic device 100'.

To resolve the foregoing problems, an embodiment of this application provides an electronic device 100.

Figure 3:
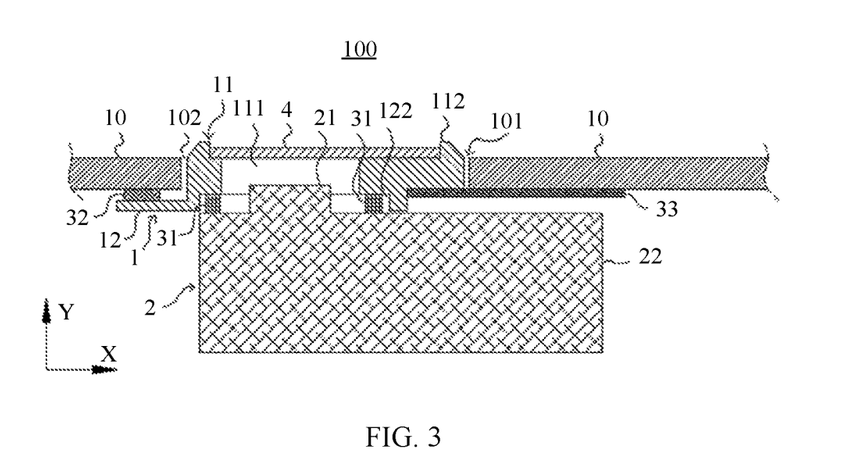
FIG. 3 is a partial sectional view of an electronic device according to an embodiment of this application.

FIG. 3 is a partial sectional view of an electronic device according to an embodiment of this application. The electronic device 100 includes a housing 10, a decorative part 1, and a camera module 2, and the decorative part 1 is connected to the housing 10. The housing 10 is provided with a mounting hole 101. The decorative part 1 includes a decorative part body 11 and a skirt structure 12 connected to the decorative part body 11. The camera module 2 includes a lens 21 and a module body 22 connected to the lens 21. The decorative part body 11 is disposed on the periphery of the lens 21 and disposed in the mounting hole 101. In some implementation solutions, the decorative part body 11 includes a light hole 111 and a first mounting portion 112. The first mounting portion 112 is used for mounting of a protection plate 4. For example, fastening is achieved through gluing. The protection plate 4 is used to protect the lens 21. Light enters the light hole 111 through the protection plate 4 and then is transmitted to the camera module 2. That is, a region where the lens 21 is located is a light-in region, and a region where the module body 22 is located is not a light-in region. In addition, the lens 21 may be telescopically moved in the light hole 111, that is, the lens 21 may be telescopically moved inside the decorative part body 11, thereby achieving automatic focusing of the camera module 2. For the camera module 2 having an automatic focusing function, the camera module 22 may include a voice coil motor (voice coil motor, VCM), a holder, an image sensor, and a circuit board, which will not be elaborated here.

To ensure that the lens 21 is not polluted by external dust or moisture, a first seal 31 is disposed between the module body 22 and the decorative part body 11, and the first seal 31 is disposed around the periphery of the lens 21. In some implementation solutions, the first seal 31 may be formed by an adhesive such as a hot melt adhesive, a foam adhesive, plastic, an inorganic adhesive, an organic adhesive, and a polymer adhesive, which is not specifically limited in this application. Fastening of the decorative part body 11 and the module body 22 (or the decorative part 1 and the camera module 2) can also be achieved by using the first seal 31 formed by the foregoing adhesive. To ensure that the first seal 31 is stably disposed on the periphery of the lens 21, that is, the first seal 31 is less prone to moving, the skirt structure 12 is provided with a second mounting portion 122, and the first seal 31 may be accommodated in the second mounting portion 122.

To achieve sealing between the decorative part 1 and the housing 10, a seal is disposed between the decorative part 1 and the housing 10. For example, a second seal 32 is disposed between the skirt structure 12 and an inner wall of the housing 10, where the second seal 32 may be formed by an adhesive, or may be a seal ring made of a rubber material. When the skirt structure 12 is fastened to the housing 10 by the second seal 32, the second seal 32 may be formed by an adhesive, which may also ensure a reliable connection between the decorative part 1 and the housing 10. For another example, a seal is disposed between the decorative part body 11 and a side wall of the mounting hole 101, and the seal may be formed by an adhesive. For another example, a seal is disposed between the decorative part body 11 and an outer wall of the housing 10, and the seal may be formed by an adhesive. In some implementations, the area of a space surrounded by the periphery of the second seal 32 is greater than the area of a notch 121, and after the notch 121 is disposed in this way, dust or moisture may be prevented from entering the internal of the electronic device 100 through a space between the skirt structure 12 and the inner wall of the housing 10. That is, it is only necessary to ensure that dust or moisture fail to enter the internal of the electronic device 100 through the notch 121.

To ensure that the camera module 2 is less prone to being damaged by the skirt structure 12, the skirt structure 12 is provided with the notch 121 (refer to FIG. 8 to FIG. 14), the notch 121 is opposite to a part of the module body 22, and an orthographic projection of the part of the module body 22 opposite to the notch 121 onto a plane of the skirt structure 12 is located does not fall into the skirt structure 12. In the electronic device 20 provided in this application, the skirt structure 12 of the decorative part 1 is provided with the notch 121, and the orthographic projection of the part of the module body 22 opposite to the notch 121 onto the plane of the skirt structure 12 is located does not fall into the skirt structure 12, thereby ensuring that the skirt structure 12 of the decorative part 1 does not interfere with the camera module 2, and ensuring that the camera module 2 is less prone to being damaged by the skirt structure 12.

It may be understood that the orthographic projection of the part of the module body 22 opposite to the notch 121 onto the plane of the skirt structure 12 is located is a projection of the part of module body 22 opposite to the notch 121 onto the plane of the skirt structure 12 is located, along the thickness direction Y of the module body 22.

The specific structure of the decorative part 1 is described below.

Figure 8:
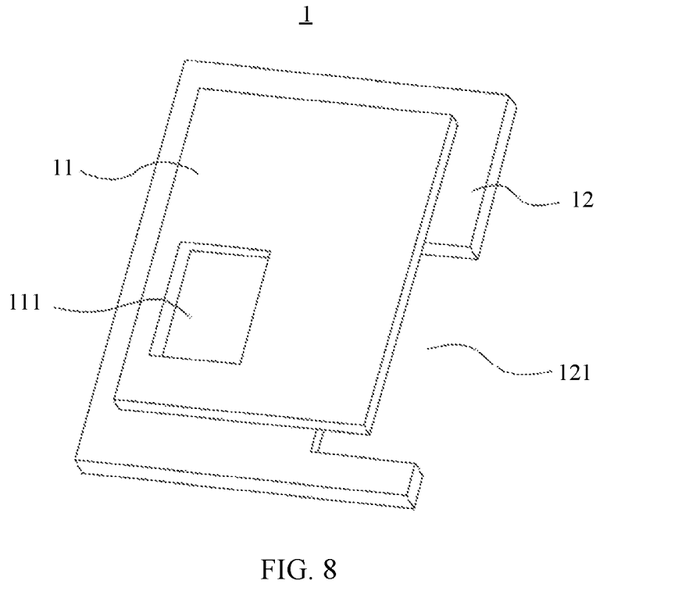
FIG. 8 is a schematic structural diagram of a decorative part, in a perspective, according to an embodiment of this application.
Figure 9:
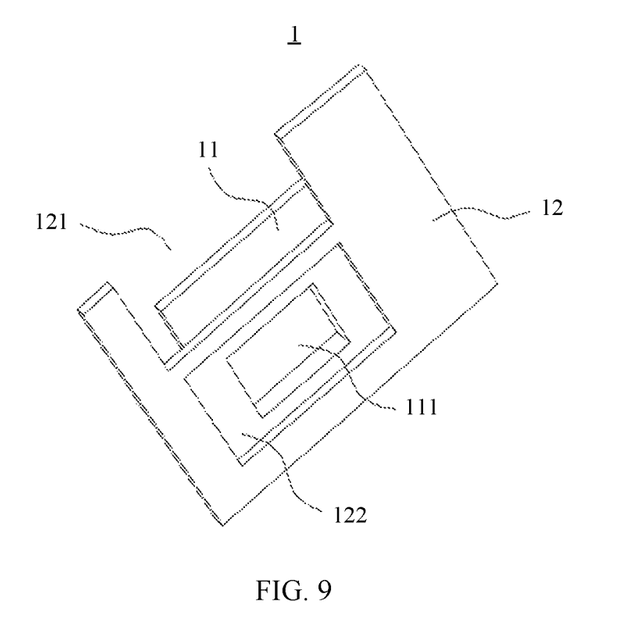
FIG. 9 is a schematic structural diagram of the decorative part, in another perspective, shown in FIG. 8.

FIG. 8 and FIG. 9 are schematic structural diagrams of a decorative part according to an embodiment of this application. In this implementation, a notch 121 passes through at least a side wall, along a length direction X of the module body 22, of the skirt structure 12, that is, the skirt structure 12 opposite to a part of the module body 22 is cut off fully, so that when the housing 10 of the electronic device 100 is squeezed (for example, being squeezed by collision or dropping), the edge of the skirt structure 12 cannot touch the camera module 2. In some implementation solutions, a cut-off method may refer to a method of cutting with a milling cutter or with laser, which is not specifically limited in this application.

Figure 10:
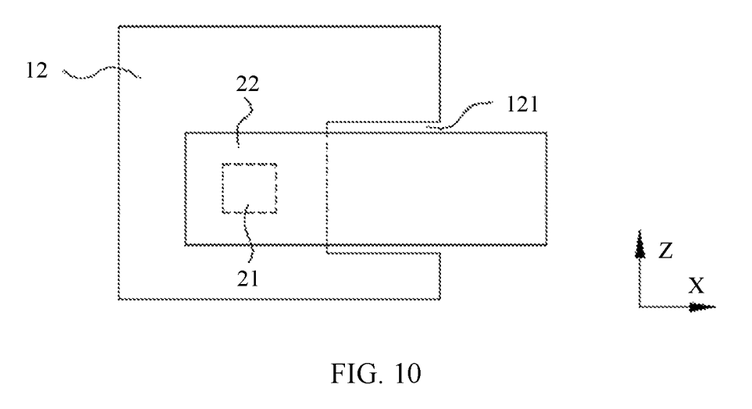
FIG. 10 is a bottom view showing matching between the decorative part shown in FIG. 8 and a camera module.

In this implementation, a matching relationship between the decorative part 1 and the camera module 2 is shown in FIG. 10. Along a length direction X of the module body 22, the edge of the module body 22 exceeds the edge of the notch 121. Along a width direction Z of the module body 22, the edge of the module body 22 does not exceed the edge of the notch 121. That is, an orthographic projection of the part of the module body 22 opposite to the notch 121 onto a plane of the skirt structure 12 is located does not fall into the skirt structure 12.

In some implementations, along a thickness direction Y of the module body 22, a notch 121 at least passes through a surface, opposite to the module body 22, of the skirt structure 12. For example, the notch 121 may pass through upper and lower surfaces of the skirt structure 12 (refer to FIG. 3, FIG. 4, FIG. 6, and FIG. 7), or may pass through a lower surface of the skirt structure 12 but does not pass through an upper surface of the skirt structure 12 (refer to FIG. 5), that is, an opening depth of the notch 121 is not specifically limited in this application. When the notch 121 fully passes through the upper and lower surfaces of the skirt structure 12, a sealing measure is required for the decorative part 1 (refer to the description below). When the notch passes through the lower surface of the skirt structure 12 but does not pass through the upper surface of the skirt structure 12, a sealing measure may not be required for the decorative part 1.

Still referring to the implementations shown in FIG. 3 and FIG. 10, the notch 121 passes through at least a side wall, along the length direction X of the module body 22, of the skirt structure 12, and therefore, the corresponding part of the second seal 32 at the notch 121 may also be cut off correspondingly. In addition, there is a gap 102 between the mounting hole 101 and the decorative part body 11, the gap 102 communicates with the notch 121, and external dust or moisture may enter the notch 121 through the gap 102. This may result in pollution to the module body 22. To avoid this situation, the electronic device 100 further includes a third seal 33 (as shown in FIG. 3), at least a part of the third seal 33 is disposed in the notch 121, and the third seal 33 covers the gap 102. In some implementation solutions, the third seal 33 may be a film, such as a polyester (PET) film. The third seal 33 may be inadhesive, and the third seal 33 may be glued to the decorative part body 11 and the inner wall of the housing 10 by using a back glue.

Figure 11:
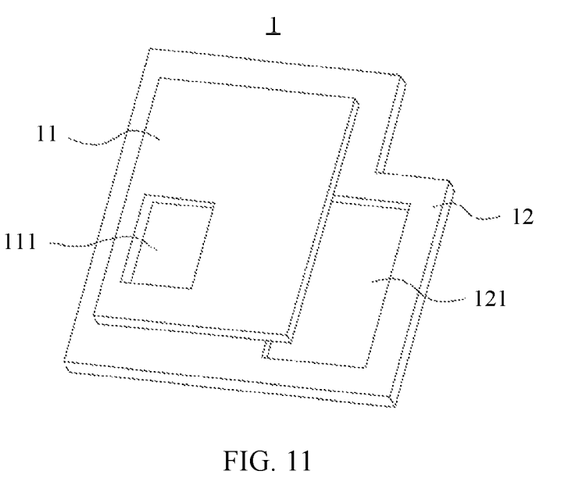
FIG. 11 is a schematic structural diagram of a decorative part, in a perspective, according to another embodiment of this application.
Figure 12:
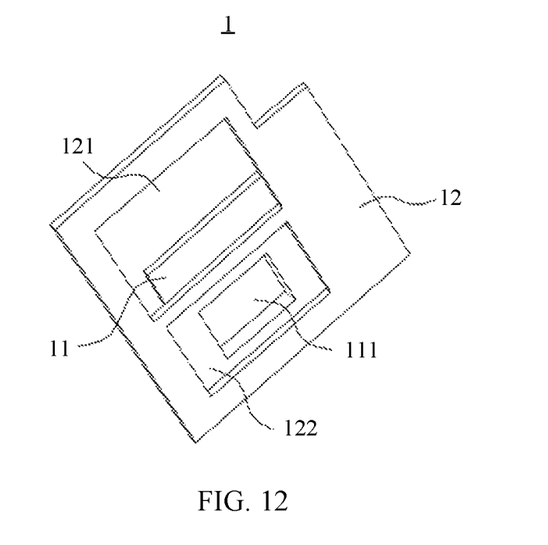
FIG. 12 is a schematic structural diagram of the decorative part, in another perspective, according to the another embodiment of this application.
Figure 13:
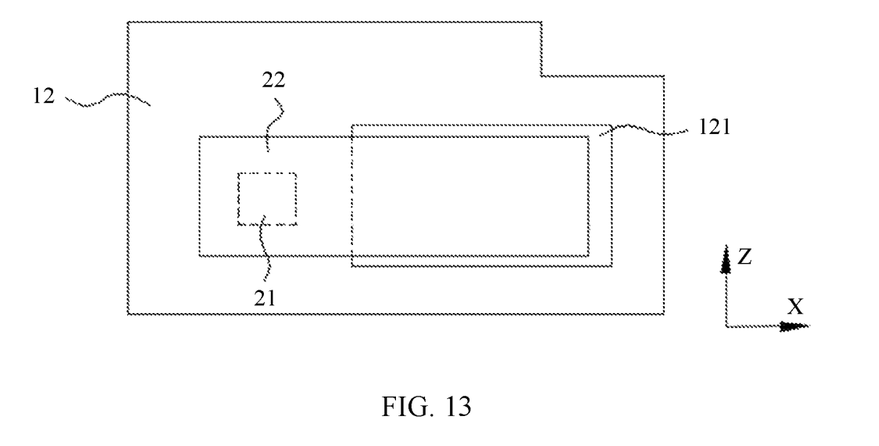
FIG. 13 is a bottom view showing matching between the decorative part shown in FIG. 11 and a camera module.
Figure 14:
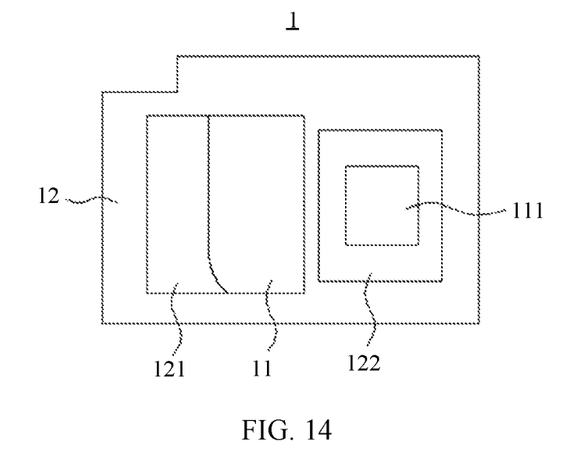
FIG. 14 is a bottom view of the decorative part shown in FIG. 11.
Figure 15:
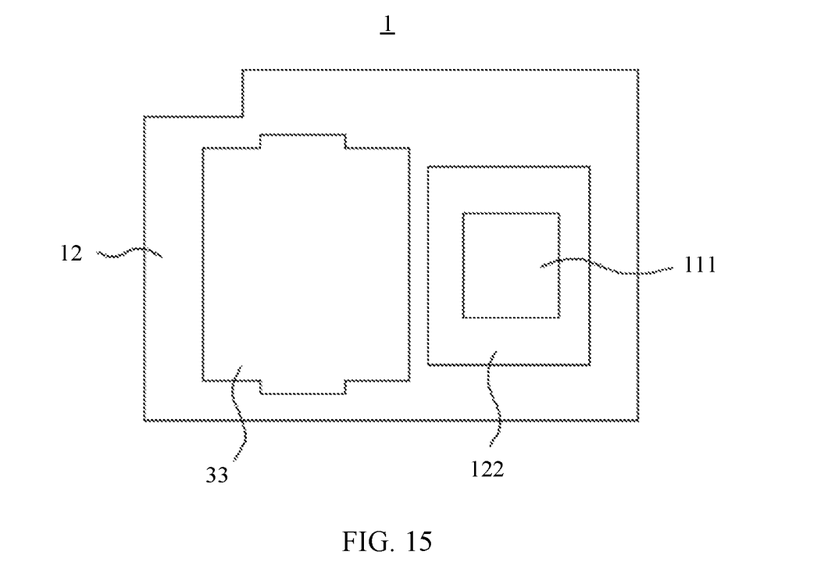
FIG. 15 is a bottom view showing matching between the decorative part shown in FIG. 11 and a third seal.
Figure 16:
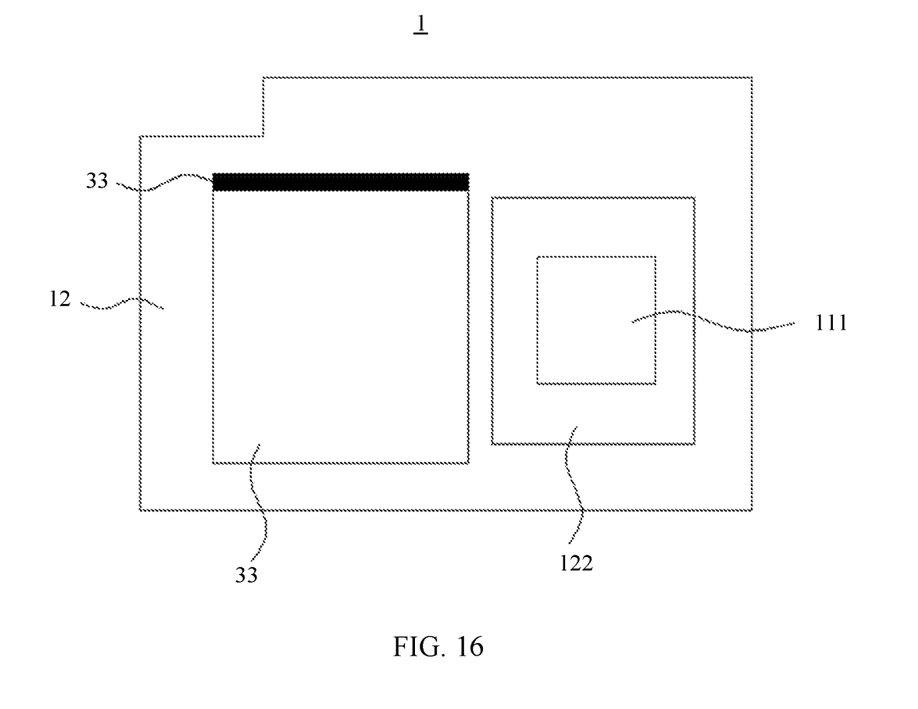
FIG. 16 is another bottom view showing the matching between the decorative part shown in FIG. 11 and the third seal.

As shown in FIG. 14 and FIG. 16, here a decorative part shown in FIG. 11 and FIG. 12 is used as an example for description. In some implementation solutions, an orthographic projection of a third seal 33 onto a plane in which a skirt structure 12 is located does not exceed the edge of a notch 121, a sealant 331 is disposed between the third seal 33 and the notch 121, and therefore, sealing between the third seal 33 and the notch 121 is achieved through gluing. In some other implementation solutions, as shown in FIG. 14 and FIG. 15, the area of the third seal 33 may be greater than the area of the notch 121, and therefore, gluing may be omitted, and by directly fastening the third seal 33 to the skirt structure 12, sealing between the third seal 33 and the notch 121 can also be achieved.

In some other implementations, to prevent external dust or moisture from entering the notch 121 through the gap 102, at least one of the gap 102 and the notch 121 is provided with a sealant. A type of the sealant includes, but is not limited to, an adhesive such as a hot melt adhesive, a foam adhesive, plastic, an inorganic adhesive, an organic adhesive, and a polymer adhesive. In some implementation solutions, a sealant may be disposed in the gap 102 by dispensing, and therefore, the gap 102 may be sealed, while fastening between the decorative part body 11 and the side wall of the mounting hole 101 may also be achieved. In some other implementation solutions, a sealant may alternatively be disposed in the gap 102 and the notch 121 through potting. This method requires more sealant compared with the method of dispensing, but achieves a stronger fastening effect than the method of dispensing. To resolve pollution problem that may be caused by arrangement of the notch 121, this application adopts a solution of isolating the camera module 2 from the external by sealing. In this solution, a method of gluing by a seal (for example, the third seal 33) may be used, or a method of sealing by glue (for example, glue dispensing or plotting) may be used, provided that the camera module 2 can be sealed from the external.

FIG. 11 and FIG. 12 are schematic structural diagrams of a decorative part according to another embodiment of this application. In this implementation, a notch 121 does not pass through at least a side wall, along a length direction X of the module body 22, of the skirt structure 12, that is, the notch 121 is formed inside the skirt structure 12. Compared with the decorative part shown in FIG. 8 and FIG. 9, the decorative part 1 provided in this implementation is more reliably connected to the housing 10, that is, possible structure instability of the decorative part 1, in a direction where the notch 121 is disposed, cannot be caused due to arrangement of the notch 121. As shown in FIG. 12, along both a length direction X and a width direction Z of the module body 22, the edge of the module body 22 does not exceed the edge of the notch 121. That is, an orthographic projection of the part of the module body 22 opposite to the notch 121 onto a plane of the skirt structure 12 is located does not fall into the skirt structure 12.

In some implementations, along a thickness direction Y of the module body 22, a notch 121 at least passes through a surface, opposite to the module body 22, of the skirt structure 12. For example, the notch 121 may pass through upper and lower surfaces of the skirt structure 12 (refer to FIG. 3, FIG. 4, FIG. 6, and FIG. 7), or may pass through a lower surface of the skirt structure 12 but does not pass through an upper surface of the skirt structure 12 (refer to FIG. 5), that is, an opening depth of the notch 121 is not specifically limited in this application. When the notch 121 fully passes through the upper and lower surfaces of the skirt structure 12, a sealing measure is required for the decorative part 1 (refer to the description below). When the notch passes through the lower surface of the skirt structure 12 but does not pass through the upper surface of the skirt structure 12, a sealing measure may not be required for the decorative part 1.

Figure 4:
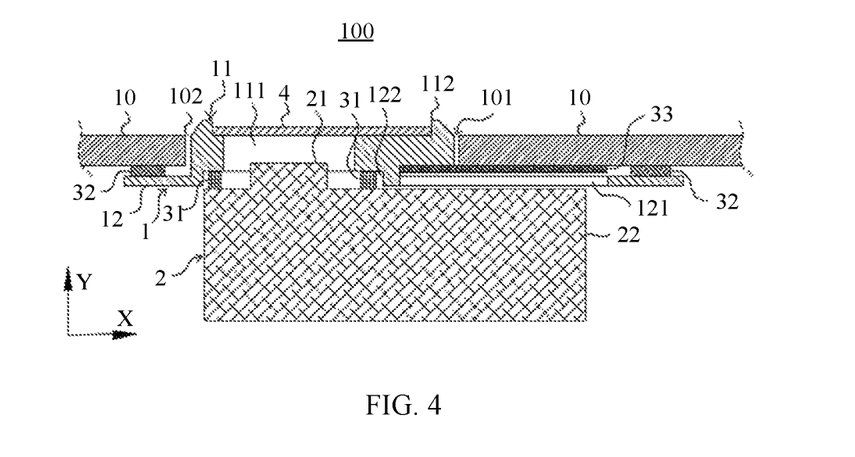
FIG. 4 is a partial sectional view of an electronic device according to another embodiment of this application.
Figure 5:
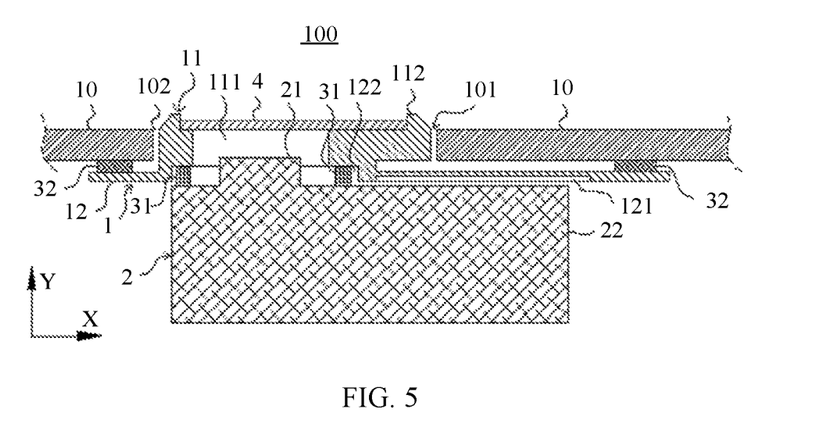
FIG. 5 is a partial sectional view of an electronic device according to another embodiment of this application.

In some implementations, there is a gap 102 between the mounting hole 101 and the decorative part body 11, the gap 102 communicates with the notch 121, and external dust or moisture can enter the notch 121 through the gap 102. This may result in pollution to the module body 22. To avoid this situation, the electronic device 100 further includes a third seal 33 (as shown in FIG. 4), at least a part of the third seal 33 is disposed in the notch 121, and the third seal 33 covers the gap 102. In some implementation solutions, the third seal 33 may be a film, such as a polyester (PET) film. The third seal 33 may be inadhesive, and the third seal 33 may be glued to the decorative part body 11 and the inner wall of the housing 10 by using a back glue.

It should be pointed out that along the length direction X of the module body 22, the skirt structure 12 of the decorative part shown in FIG. 11 is longer than the skirt structure 12 of the decorative part shown in FIG. 8. In addition, along the length direction X of the module body 22, the edge of the skirt structure 12 of the decorative part shown in FIG. 11 exceeds the edge of the module body 22, and therefore, stability in fastening between the decorative part 1 and the housing 10 may be further ensured.

In some implementation solutions, as shown in FIG. 14 and FIG. 16, the orthographic projection of the third seal 33 onto the plane of the skirt structure 12 is located does not exceed the edge of the notch 121, the sealant 331 is disposed between the edge of the third seal 33 and the notch 121, and therefore, sealing between the third seal 33 and the notch 121 is achieved through gluing. In some other implementation solutions, as shown in FIG. 14 and FIG. 15, the area of the third seal 33 may be greater than the area of the notch 121, and therefore, gluing may be omitted, and by directly fastening the third seal 33 to the skirt structure 12, sealing between the third seal 33 and the notch 121 can also be achieved.

In some other implementations, to prevent external dust or moisture from entering the notch 121 through the gap 102, at least one of the gap 102 and the notch 121 is provided with a sealant. A type of the sealant includes, but is not limited to, an adhesive such as a hot melt adhesive, a foam adhesive, plastic, an inorganic adhesive, an organic adhesive, and a polymer adhesive. In some implementation solutions, a sealant may be disposed in the gap 102 by dispensing, and therefore, the gap 102 may be sealed, while fastening between the decorative part body 11 and the side wall of the mounting hole 101 may also be achieved. In some other implementation solutions, a sealant may alternatively be disposed in the gap 102 and the notch 121 through potting. This method requires more sealant compared with the method of dispensing, but achieves a stronger fastening effect than the method of dispensing. To resolve pollution problem that may be caused by arrangement of the notch 121, this application adopts a solution of isolating the camera module 2 from the external by sealing. In this solution, a method of gluing by a seal (for example, the third seal 33) may be used, or a method of sealing by glue (for example, glue dispensing or plotting) may be used, provided that the camera module 2 can be sealed from the external.

Figure 17:
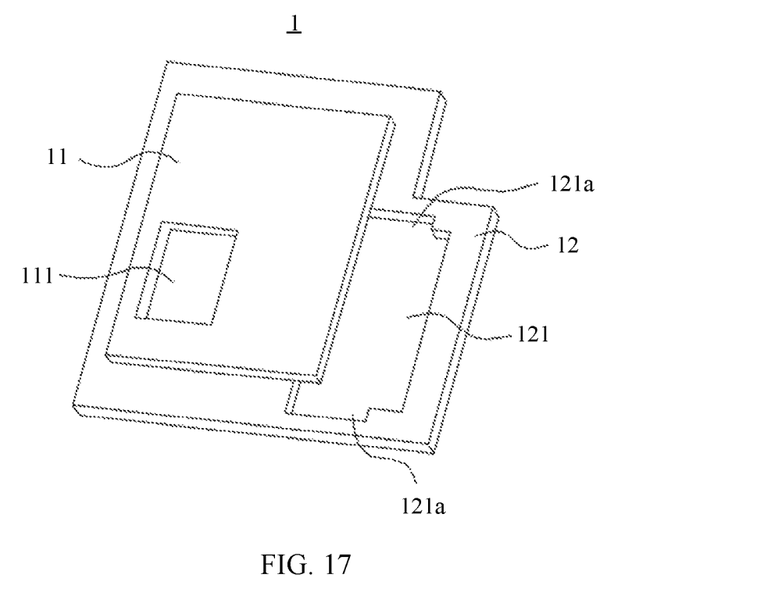
FIG. 17 is a schematic structural diagram of a decorative part, in a perspective, according to another embodiment of this application.
Figure 18:
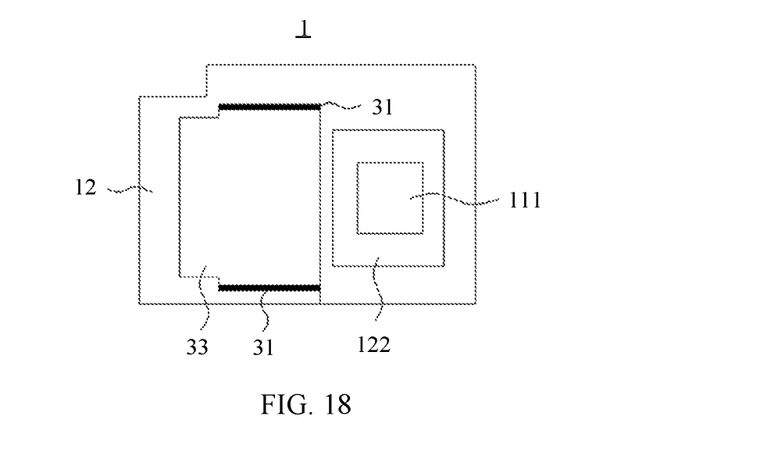
FIG. 18 is a bottom view showing matching between the decorative part shown in FIG. 17 and a third seal.

In some other implementations, as shown in FIG. 17 and FIG. 18, a notch 121 is also connected to a groove 121a, and the quantity of the groove 121a may be one, two, or more. Similar to the foregoing implementation, a sealant 331 is disposed between the third seal 33 and the edge of the notch 121, and therefore, sealing between the third seal 33 and the notch 121 is achieved through gluing. In addition, the groove 121a is disposed, the sealant 331 may be accommodated in the groove 121a better, and therefore, the sealant 331 is prevented from overflowing out of the notch 121 and/or the groove 121a.

Figure 6:
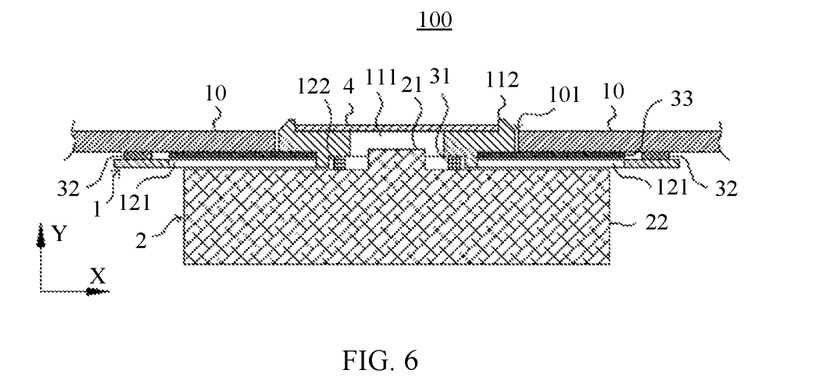
FIG. 6 is a partial sectional view of an electronic device according to another embodiment of this application.

FIG. 6 is a partial sectional view of an electronic device according to another embodiment of this application. In this implementation, a module body 22 extends along a direction of a direction length direction X of the module body 22, and can also extend along a direction opposite to an extension direction of a module body 22 shown in FIG. 4. To ensure that no interference is generated between a skirt structure 12 and the module body 22 in FIG. 6, in this implementation, along an extension direction of the module body 22, the edge of the skirt structure 12 exceeds the edge of the module body 22; moreover, both sides, along the length direction X of the module body 22, of the skirt structure 12 are provided with notches 121, and both the two notches 121 are provided with third seals 33 inside to seal a gap 102 and the notches 121.

Figure 7:
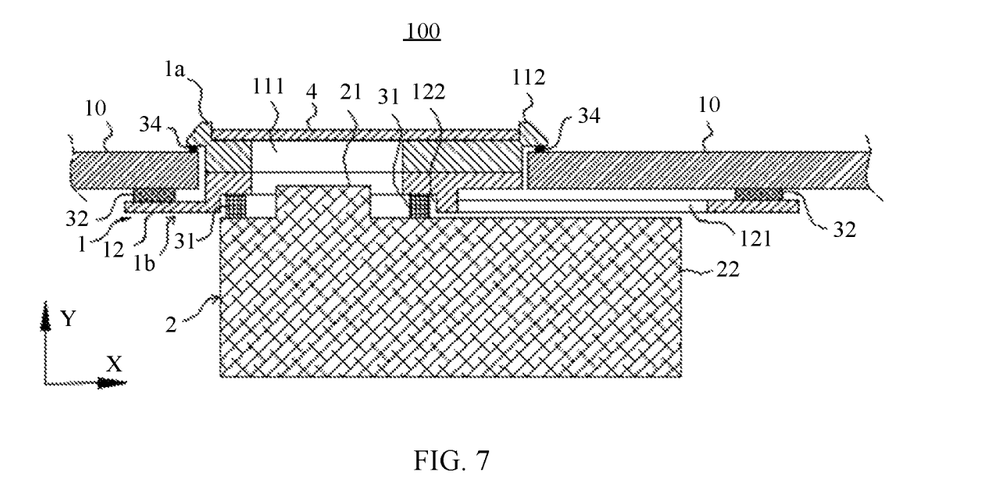
FIG. 7 is a partial sectional view of an electronic device according to another embodiment of this application.

FIG. 7 is a partial sectional view of an electronic device according to another embodiment of this application. In this implementation, a decorative part 1 includes a first decorative part 1a and a second decorative part 1b, where an orthographic projection of a part of the first decorative part 1a to a housing 10 exceeds a mounting hole 101, a fourth seal 34 is disposed between the part, exceeding the mounting hole 101, of the first decorative part 1a and the housing 10, and the fourth seal 34 is disposed around the periphery of the mounting hole 101; and the second decorative part 1b is connected to the first decorative part 1a, the second decorative part 1b includes a skirt structure 12, and the second decorative part 1b is connected to both a module body 22 and the housing 10. That is, in this implementation, the fourth seal 34 is disposed between the decorative part 1 and an outer wall of the housing 10, and therefore, external dust or moisture is prevented from entering the inside of the electronic device through a gap 102. In some implementation solutions, a type of the fourth seal 34 includes, but is not limited to, an adhesive such as a hot melt adhesive, a foam adhesive, plastic, an inorganic adhesive, an organic adhesive, and a polymer adhesive. Therefore, sealing between the decorative part 1 and the housing 10 may be achieved, and fastening between the two can also be achieved. Compared with the decorative parts shown in FIG. 3 to FIG. 6, the decorative part 1 shown in FIG. 7 has a higher protrusion height from the housing 10.

In addition, the first decorative part 1a and the second decorative part 1b may be connected through gluing, welding, or clamping, which is not specifically limited in this application.

Figure 19:
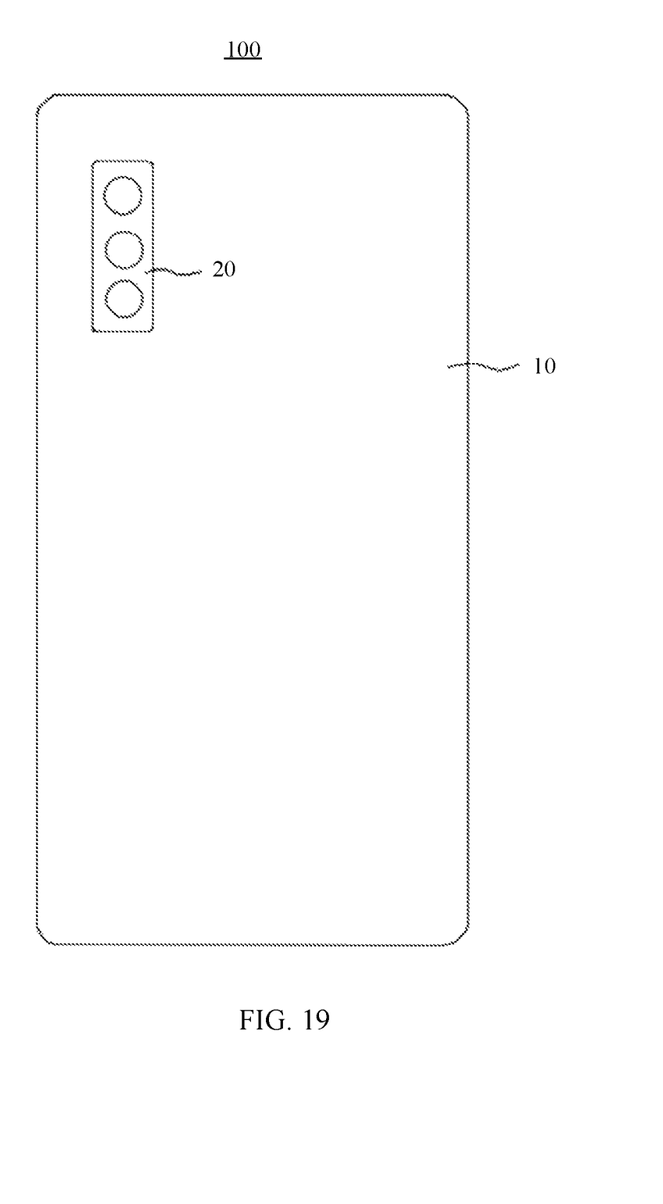
FIG. 19 is a front view of an electronic device according to an embodiment of this application.

FIG. 19 is a front view of an electronic device according to an embodiment of this application. The electronic device 100 includes a housing 10 and an electronic device 20 connected to the housing 10. The electronic device 100 manufactured based on the foregoing electronic device 20 is thinner, that is, an avoidance space between a decorative part 1 and a module body 2 can be eliminated. In addition, a part of a skirt structure 12 of the decorative part 1 is cut off, which may cause an impact of poor sealing effect. On the premise of ensuring a smaller thickness of the electronic device 100, a sealing way of the decorative part 1 (refer to the foregoing description) is improved, so that a good sealing effect is maintained. It should be noted that FIG. 19 is only an example, in which the quantity of lens 21 of the electronic device 20 is not limited to three, for example, it may be one, two, or at least three.

In some implementations, the electronic device 100 may be any (for example, a mobile phone shown in FIG. 19) of various types of computer system devices that are mobile or portable and perform wireless communications. In some implementation solutions, the electronic device 100 may be a mobile phone or a smartphone (for example, a phone based on iPhone™ or Android™), a portable game device (for example, Nintendo DS™, Play Station Portable™, Gameboy Advance™, or iPhone™), a laptop computer, PDA, a portable Internet device, a music player, or a data storage device, another handheld device, a watch, an earphone, a pendant, a headset, or the like. The electronic device 100 may also be another wearable device (for example, electronic glasses, electronic clothes, an electronic bracelet, an electronic necklace, an electronic tattoo, or a head-mounted device of a smartwatch).

The electronic device 100 may also be any one of a plurality of electronic devices 100. The plurality of electronic devices 100 include but are not limited to a cell phone, a smartphone, another wireless communications device, a personal digital assistant, an audio player, another media player, a music recorder, a video recorder, a camera, another media recorder, a radio set, a medical device, a vehicle transportation instrument, a calculator, a programmable remote control, a pager, a laptop computer, a desktop computer, a printer, a netbook computer, a personal digital assistant (PDA), a portable multimedia player (PMP), a motion picture experts group (MPEG-1 or MPEG-2) audio layer (MP3) player, a portable medical device, a digital camera, or a combination thereof.

The foregoing descriptions are only the embodiments of this application and not intended to limit this application. Any modifications, equivalent replacements, improvements, and the like, made within the spirit and principle of this application shall fall within the protection scope of this application.

What is claimed is:
1. An electronic device, comprising:
   a housing with a mounting hole;
   a camera module, wherein the camera module comprises at least one lens and a module body connected to the lens; and
   a decorative part, comprising:
      a decorative part body;

a skirt structure connected to the decorative part body; and a light hole corresponding to each of the at least one lens of the camera module, wherein the skirt structure is provided with a notch, and the notch is opposite to a part of the module body, and wherein each light hole is spaced apart from the notch in a length and/or width direction of the electronic device.

2. The electronic device of claim 1, wherein the decorative part body is disposed on a periphery of the lens and disposed in the mounting hole.

3. The electronic device of claim 2, wherein, along a thickness direction of the module body, the notch at least passes a surface of the skirt structure, wherein the surface is opposite to the module body.

4. The electronic device of claim 2, wherein a second seal is disposed between the skirt and the housing.

5. The electronic device of claim 1, wherein an orthographic projection of the part of the module body onto a plane of the skirt structure does not fall into the skirt structure, wherein the part of the module body is opposite to the notch.

6. The electronic device of claim 5, wherein, along a thickness direction of the module body, the notch at least passes a surface of the skirt structure, wherein the surface is opposite to the module body.

7. The electronic device of claim 5, wherein a second seal is disposed between the skirt and the housing.

8. The electronic device of claim 1, wherein the notch passes through at least a side wall of the skirt structure, wherein the side wall is along a length direction of the module body.

9. The electronic device of claim 1, wherein, along a length direction of the module body, an edge of an orthographic projection of the part of the module body does not exceed the edge of the notch, wherein the orthographic projection is onto the plane of the skirt structure.

10. The electronic device of claim 1, wherein, along a thickness direction of the module body, the notch at least passes a surface of the skirt structure, wherein the surface is opposite to the module body.

11. The electronic device of claim 1, wherein a first seal is disposed between the module body and the decorative part body, and wherein the first seal is disposed around the periphery of the lens.

12. The electronic device of claim 1, wherein a second seal is disposed between the skirt and the housing.

13. The electronic device of claim 1, wherein the electronic device further comprises:

a third seal; and a gap that is formed between the mounting hole and the decorative part body, wherein the gap communicates with the notch; and wherein at least a part of the third seal is disposed in the notch, and the third seal covers the gap corresponding to the notch.

14. The electronic device of claim 13, wherein an orthographic projection of the third seal onto the plane of the skirt structure does not exceed the edge of the notch, and wherein a sealant is disposed between the third seal and the edge of the notch.

15. The electronic device of claim 1, wherein a gap is formed between the mounting hole and the decorative part body, wherein the gap connects with the notch and at least one of the gap and the notch is provided with a sealant.

16. An electronic device, comprising:

a camera module, wherein the camera module comprises a lens and a module body connected to the lens; and a decorative part, comprising:

a decorative part body; and a skirt structure connected to the decorative part body, wherein the skirt structure extends beyond the decorative part body in length and width directions of the electronic device, wherein an orthographic projection of a part of the module body onto a plane of the skirt structure does not fall into the skirt structure.

17. The electronic device of claim 16, wherein the skirt structure is spaced apart from the decorative part body in a thickness direction of the electronic device.

18. The electronic device of claim 16, wherein a first seal is disposed between the module body and the decorative part body, and the first seal is disposed around the periphery of the lens.

19. The electronic device of claim 16, further comprising a housing with a mounting hole, wherein the decorative part body is disposed on a periphery of the lens and disposed in the mounting hole.

20. The electronic device of claim 19, wherein a second seal is disposed between the skirt and the housing.

* * * * *